3,445,338
EQUILIN PROCESS
Gunther Kruger, St. Laurent, Montreal, Quebec, Surendra N. Sehgal, Dollard des Ormeaux, Quebec, and Claude Vezina, Oka, Quebec, Canada, assignors to American Home Products Corporation, New York, N.Y., a corporation of Delaware
No Drawing. Filed Feb. 3, 1967, Ser. No. 613,748
Int. Cl. C12b 1/00; C07c 167/16
U.S. Cl. 195—51
11 Claims

ABSTRACT OF THE DISCLOSURE

There are disclosed herein a process for preparing the naturally occurring estrogen equilin, starting from estra-4,6-diene-3,17-dione, 3,17 - dioxandrosta-4,6-dien-19-al, or 3,17-dioxoandrosta - 4,6 - dien-19-oic acid, comprising treating the above compounds with alkali to obtain estra-5,7-diene-3,17-dione, and converting the latter compound by microbiological means to equilin.

---

The present invention relates to a process for preparing steroids with an aromatic ring A. More particularly, the present invention relates to the partial synthesis of equilin (III), an important estrogenic hormone, and to a novel intermediate used in the synthesis thereof.

Moreover, this invention relates to a process for preparing equilin which process appears to be superior to the presently available processes as described in the chemical literature.

There is, for example, a process for the preparation of equilin described by J. A. Zderic et al. in Steroids, 1, 233 (1960); J. Am. Chem. Soc., 80, 2596 (1958); and in U.S. Patent No. 3,067,212. Also for example, two other processes are described by J. T. Bagli et al. in Tetrahedron Letters, 387 (1964), which are embodied in U.S. Patent No. 3,272,847 and U.S. Patent No. 3,272,848 granted to D. S. Irvine et al. All three of these processes are dependent on the microbiological conversion of a steroidal-4,7-dien-3-one to equilin. As distinguished from these processes, the process of this invention utilizes the conversion of estra-4,6-diene-3,17-dione (Ia), described by J. A. Zderic et al. in Steroids I, 233 (1963), or 3,17-dioxoandrosta-4,6-dien-19-al (Ib) described by K. Heusler et al. in Experimentia, 18, 464 (1962), or 3,17 - dioxoandrosta - 4,6 - dien - 19 - oic acid (Ic), described in U.S. Patent No. 3,250,792, to the novel intermediate, estra - 5,7 - diene - 3,17 - dione (II) which is readily converted to equilin (III) by a number of microorganisms.

The process of this invention appears to be superior to the other available processes because of the excellent yields obtained for the process represented by the formula I→II→III. The main reason for the observed efficiency of the process of this invention may be attributed to the significantly lesser degree of side reactions that accompany the formation of the novel intermediate estra-5,7-dien-3,17-dione as compared to the side reactions observed for the formation of the steroidal-4,7-dien-3-ones used in the available methods mentioned above. In a preferred embodiment of this invention estra - 4,6 - diene - 3,17-dione (I) is treated with 0.1 to 8 parts, preferably 0.75 part of an alkali metal alkoxide of lower alkanols, such as, for example, potassium t-butoxide or preferably sodium methoxide, or an alkali metal hydroxide, such as, for example, potassium hydroxide, or sodium hydroxide, or an alkali metal hydride such as, for example, sodium hydride, in dimethylsulfoxide solution, or by using a previously prepared solution of methylsulfinyl anion in dimethylsulfoxide prepared according to Corey and Chaykovsky, J. Am. Chem. Soc., 84, 866 (1962), with or without an inert cosolvent such as ether, benzene, or tetrahydrofuran, preferably in a nitrogen atmosphere for a period of 10 seconds to one hour, preferably 3 minutes, at temperatures ranging from —20° to +60° C., with preference to the 0°–20° C. range. Subsequent treatment of this reaction mixture with an excess of a weak acid, such as, oxalic acid, formic acid, or preferably acetic acid, preferably diluted with an inert solvent, such as, for example, water, benzene, or hexane at temperatures from 0° to 40° C yields the novel estra-5,7-diene-3,17-dione (II) in a high degree of purity.

In the same manner, 3,17 - dioxoandrosta - 4,6 - dien-19-al (Ib) and 3,17 - dioxoandrosta - 4,6 - dien - 19 - oic acid (Ic) yield estra-5,7-diene-3,17-dione (II).

Noteworthy is the fact that by using strong acids such as hydrochloric acid in place of a weak acid in the just described process, the product is a complicated mixture of estra - 4,7 - dien-3,17-dione, estra-5(10),7-diene-3,17-dione, some estra-5,7-dien-3,17-dione and other contaminants; whereas, by using the milder conditions of the process of this invention a better yield of a pure estra-5,7-dien-3,17-dione, is obtained which may subsequently be used as a substrate for microbiological aromatisation to equilin.

By exposing estra - 5,7 - diene - 3,17 - dione (II) to the activity obtainable in a suitable medium inoculated with microorganisms from the species Nocardia, such as, for example N. rubra NRRL B–685, N. corallina ATCC 999, ATCC 13,258 and ATCC 13,259, N. restrictus ATCC 14,887, N. asteroides ATCC 6846, ATCC 9970, and 10,904, N. canicruria ATTC 17,896, N. erythropolis ATCC 17,895, N. opaca ATCC 4276, and N. convoluta ATCC 4275; Arthrobacter simplex ATCC 13,260, Arthrobacter species ATCC 19,140; Corynebacterium simplex ATCC 6946; Mycobacterium, such as, for example, M. rhodochrous ATCC 4273, and ATCC 9356, or M. fortuitum ATCC 6841; equilin is obtained. This may be obtained by exposing estra-5,7-diene-3,17-dione to the enzymatic activity obtainable from a growing culture or from the resting cells of the microorganism.

The following formulae and examples will illustrate this invention.

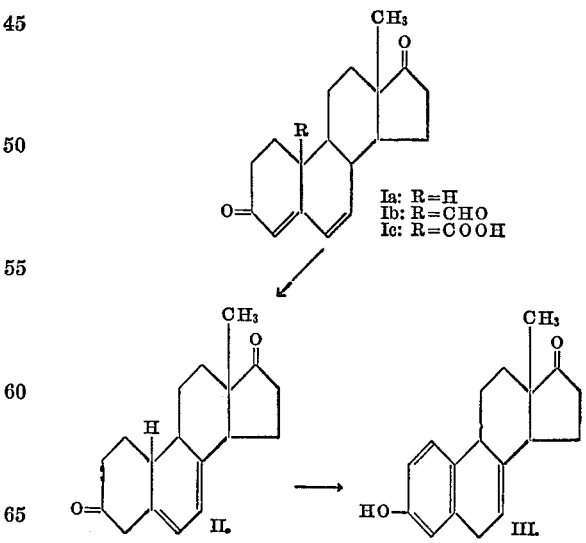

Example 1.—Estra-5,7-diene-3,17-dione (II)

Sodium methoxide (1.0 g.) is added in one portion to a suspension of finely divided estra-4,6-diene-3,17-dione (Ia, 1.0 g.) in dimethylsulfoxide (5 ml.) cooled to 18° C. The mixture is agitated under nitrogen for 3 minutes and then poured into acetic acid-benzene (1:2, 30 ml.) at room temperature. This mixture is stirred for 15 minutes and then extracted four times with water (10 ml.). The benzene solution is dried over sodium sulfate, treated with 40 ml. of hexane and filtered. The filtrate is treated with charcoal, filtered and concentrated to yield the title compound as a crystalline residue, M.P. 116–119° C. Recrystallization from methanol affords the pure title compound, M.P. 121–124° C.

$\gamma_{max.}^{CHCl_3}$ 1715

1655 and 1605 cm.$^{-1}$.

In the same manner, but replacing estra-4,6-diene-3,17-dione with 3,17-dioxoandrostra-4,6-dien-19-al (Ib) or 3,17-dioxoandrosta-4,6-dien-19-oic acid (Ic) the title compound is also obtained.

Example 2—Equilin (III)

A culture of *Nocardia rubra* NRRL B–685 from an agar slant is used to inoculate a sterile nutrient broth (50 ml.), beef extract: peptone (3:5), in a 250 ml. Erlenmeyer flask. After a 24 hour incubation period a solution of progesterone (0.5 ml. concentration=10 mg./ml. of acetone) is added and the incubation is continued for another 24 hours. At that time estra-5,7-dien-3,17-dione (II, 5 mg.) in acetone (0.5 ml.) is added to the growing culture. After another 24 hour incubation period the contents of the fermentation flask are extracted twice with ethyl acetate:benzene (1:4). The organic extract is dried over sodium sulfate, filtered, and evaporated to dyness under reduced pressure. Equilin (III) is isolated and identified by gas chromatography as the main product of the reaction.

In the same manner but replacing *Nocardia rubra* NRRL B–685 with microorganisms from other species of Nocardia, such as, for example, *N. corallina* ATCC 999, ATCC 13,258 and ATCC 13,259, *N. restrictus* ATCC 14,887 *N. asteroides* ATCC 6846, ATCC 9970, and 10,904, *N. canicruria* ATCC 17,896, *N. erythropolis* ATCC 17,895, *N. opaca* ATCC 4276, and *N convoluta* ATCC 4275; or with microorganisms from such species as Arthrobacter simplex ATCC 13,260; Arthrobacter species ATCC 19,140; Corynebacterium simplex ATCC 6946; Mycobacterium, such as, for example, *M. rhodochrous* ATCC 4273, and ATCC 9356, or *M. fortuitum* ATCC 6841; equilin is also obtained.

We claim:
1. The process of preparing equilin which comprises subjecting a compound of the formula

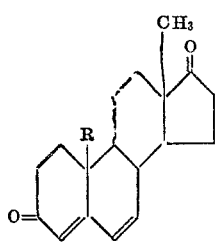

wherein R is selected from the group which consists of hydrogen, —CHO and —COOH to the action of an alkaline agent, followed by acidification of the reaction mixture with a weak acid thereby obtaining estra-5,7-diene-3,17-dione; and then microbiologically converting said last-named compound to equilin by exposing it to the enzymatic activity of a microorganism selected from the Nocardia, Arthrobacter, Corynebacteria and Mycobacteria microorganisms.

2. The process of preparing equilin which comprises subjecting a compound of the formula

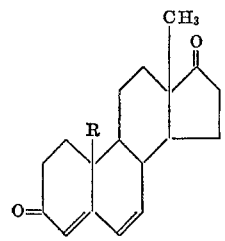

wherein R is selected from the group which consists of hydrogen, —CHO and —COOH to the action of an alkaline agent selected from the group which consists of alkali metal alkoxides of lower alkanols, alkali metal hydroxides and alkali metal hydrides; acidifying the reaction mixture by adding thereto a weak acid, thereby securing estra-5,7-diene-3,17-dione; and then subjecting said last-named compound to the enzymatic activitiy of a microorganism selected from the Nocardia, Arthrobacter, Corynebacteria and Mycobacteria microorganisms.

3. The process of preparing equilin which comprises subjecting a compound of the formula

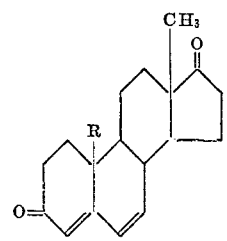

wherein R is selected from the group which consists of hydrogen, —CHO and —COOH to the action of an alkaline agent selected from the group which consists of alkali metal alkoxides of lower alkanols, alkali metal hydroxides and alkali metal hydrides at a temperature within the range —20° C. to 60° C.; acidifying the reaction mixture by the addition thereto of an excess amount of a weak acid, thereby obtaining estra-5,7-diene-3,17-dione; and subjecting said last-named compound to the enzymatic activity of a microorganism selected from the Nocardia, Arthrobacter, Corynebacteria and Mycobacteria microorganisms, thereby securing equilin.

4. The process as claimed in claim 3 wherein said microorganism is one selected from the group which consists of *Nocardia rubra*, *Nocardia corallina*, *Nocardia restrictus*, *Nocardia asteroides*, *Nocardia canicruria*, *Nocardia erythropolis*, *Nocardia opaca*, *Nocardia convoluta*, *Arthrobacter simplex*, *Arthrobacter species* ATCC No. 19,140, *Corynebacterium simplex*, *Mycobacterium rhodochrous*, and *Mycobacterium fortuitum*.

5. The process as claimed in claim 3 wherein said treatment with an alkaline agent is carried out in an inert solvent and under an atmosphere of inert gas.

6. The process as claimed in claim 3 wherein said weak acid is one selected from the group which consists of oxalic acid, formic acid and acetic acid.

7. The process which comprises subjecting a compound of the formula

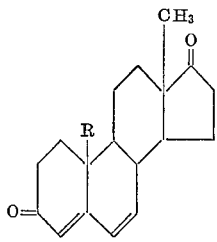

wherein R is selected from the group which consists of hydrogen, —CHO and —COOH to the action of an alkaline agent, and then acidifying the resulting reaction mixture with a weak acid, thereby obtaining estra-5,7-diene-3.17-dione.

8. The process which comprises subjecting a compound of the formula

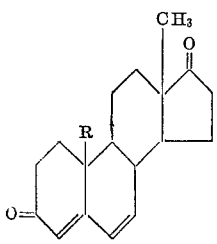

wherein R is selected from the group which consists of hydrogen, —CHO and —COOH to the action of an alkaline agent selected from the group which consists of alkali metal alkoxides of lower alkanols, alkali metal hydroxides and alkali metal hydrides; and acidifying the resulting reaction mixture by adding a weak acid thereto, thereby obtaining estra-5,7-diene-3,17-dione.

9. The process which comprises subjecting a compound of the formula

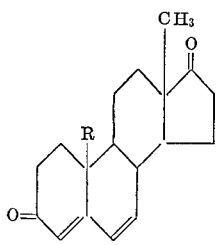

wherein R is selected from the group which consists of hydrogen, —CHO and —COOH to the action of an alkaline agent selected from the group which consists of alkali metal alkoxides of lower alkanols, alkali metal hydroxides and alkali metal hydrides at a temperature within the range —20° C. to 60° C.; and acidifying the reaction mixture by the addition thereto of an excess amount of a weak acid, thereby obtaining estra-5,7-diene-3,17-dione.

10. The process as claimed in claim 9 wherein said treatment with an alkaline agent is carried out in an inert solvent and under an atmosphere of inert gas.

11. The process as claimed in claim 9 wherein said weak acid is one selected from the group which consists of oxalic acid, formic acid and acetic acid.

References Cited

UNITED STATES PATENTS

| | | |
|---|---|---|
| 3,102,080 | 8/1963 | Raspe et al. |
| 3,162,655 | 12/1964 | Bagli et al. |
| 3,272,848 | 9/1966 | Irvine et al. |

ALVIN E. TANENHOLTZ, *Primary Examiner.*

U.S. Cl. X.R.

260—397.3